United States Patent [19]

Pritchett

[11] 4,156,062

[45] May 22, 1979

[54] PROCESS FOR TOUGHENING ETHYLENE-VINYL ACETATE COPOLYMERS AND RESINS OBTAINED THEREBY

[75] Inventor: Ervin G. Pritchett, Cincinnati, Ohio

[73] Assignee: National Distillers and Chemical Corporation, New York, N.Y.

[21] Appl. No.: 794,785

[22] Filed: May 9, 1977

[51] Int. Cl.² .............................................. C08F 8/06
[52] U.S. Cl. ................................... 526/58; 526/47.6; 526/48.1; 526/52.1; 526/52.2
[58] Field of Search ..................... 526/47.6, 48.1, 58, 526/52.1, 52.2

[56] References Cited

U.S. PATENT DOCUMENTS

| | | | |
|---|---|---|---|
| 3,267,083 | 8/1966 | Imhof | 526/47.6 |
| 3,322,734 | 5/1967 | Walkin | 526/47.6 |
| 3,756,999 | 9/1973 | Stetter et al. | 526/47.6 |
| 4,042,766 | 8/1977 | Tatsukami | 526/47.6 |

*Primary Examiner*—William F. Hamrock
*Attorney, Agent, or Firm*—Kenneth D. Tremain

[57] ABSTRACT

A process for toughening ethylene-vinyl acetate copolymers is disclosed which comprises reacting a rubbery ethylene-vinyl acetate copolymer with oxygen at elevated temperature in the presence of a catalytically effective amount of at least one catalyst selected from the group consisting of an alkali metal, ammonium or zinc salt of a weak aliphatic carboxylic acid, an alkali metal, ammonium or zinc salt of a weak aromatic carboxylic acid, an aliphatic tertiary amine, and an aromatic tertiary amine, for a period sufficient to provide an ethylene-vinyl acetate copolymer demonstrating an appreciable increase in melt viscosity as indicated by a corresponding decrease in melt flow rate compared with that of the starting copolymer.

15 Claims, No Drawings

PROCESS FOR TOUGHENING ETHYLENE-VINYL ACETATE COPOLYMERS AND RESINS OBTAINED THEREBY

BACKGROUND OF THE INVENTION

1. Field of the Invention

This invention relates to processes for improving the melt flow rate, tack and cold flow properties of ethylene-vinyl acetate resins, and more particularly, to a catalytically induced oxidative toughening of an ethylene-vinyl acetate copolymer.

2. Description of the Prior Art

Ethylene and vinyl acetate (EVA) copolymers are well known items of commerce having a wide variety of applications. EVA copolymers containing from a small amount up to about 70 weight percent combined vinyl acetate are conveniently produced by any of the known and conventional high pressure bulk or solution copolymerization techniques. EVA copolymers containing more than about 70 weight percent combined vinyl acetate are advantageously produced by low pressure emulsion copolymerization processes whose operational parameters are well known. EVA copolymers having a combined vinyl acetate content in the range of about 35 to about 70 weight percent are of particular interest due to their rubbery or elastomeric nature. However, EVA copolymers produced via the aforementioned high pressure processes tend to have relatively high melt flow rate (low molecular weight), resulting in products in the rubbery composition range which have undesirable tack and cold flow properties. And, while EVA copolymers produced by the aforementioned low pressure processes have desirably low melt flow rate, such processes are unsuitable for the production of rubbery EVA copolymers and tend also to yield undesirably high gel fractions.

Processes are known wherein EVA copolymers of high melt flow rate can be cross-linked to provide resins of reduced melt flow rate.

U.S. Pat. No. 3,491,075 describes a process for cross-linking EVA copolymers and other types of resins employing alkoxides (alcoholates) of the general formula M(OR)n wherein M is a polyvalent metal of Groups II, III, IV, V, VII and VIII, and R is an alkyl group having from 1 to about 20 carbons and n has a value of 2 to 5 as cross-linking agents. The by-product ester which is produced during the cross-linking reaction can be removed from the copolymer if desired by vaporization. Cross-linking of the resin is evidenced by a higher softening point than the original copolymer.

British Pat. No. 1,198,877 describes a process for cross-linking EVA copolymers wherein the copolymers are heated to a temperature between 60° and 250° C. in the presence of an alkali metal alcoholate as cross-linking agent. Cross-linking results in a reduction in the melt index. For example, an EVA copolymer containing 13.5 percent by weight combined vinyl acetate and a melt index of 2.5 is cross-linked in a Brabender Plastograph using lithium n-octylate to provide a copolymer of 0.4 melt index. In the cross-linking reaction, an ester is formed which may or may not be removed from the cross-linked copolymers. This patent also contemplates conducting the alcoholate cross-linking reaction simultaneously with, or subsequent to, cross-linking with peroxide. The addition of an oxidation stabilizer during the alcoholate cross-linking reaction is also described.

In the similar EVA copolymer cross-linking process described in British Pat. No. 1,198,879, alkoxo salts of the general formula $Me^1[Me^2(OR)_x]$ in which $Me^1$ is hydrogen or a mono or bivalent metal, $Me^2$ is a different mono or pentavalent metal or silicon, x has a value between 2 and 6 and the R groups are the same or different aliphatic or cycloaliphatic groups are used as the cross-linking agent. An ester is also formed in the course of the cross-linking reaction which may or may not be separated from the cross-linked resin.

East German Pat. No. 94,489 describes a process for cross-linking EVA copolymers to provide higher molecular weight resins exhibiting reduced melt index. According to this process an EVA copolymer is cross-linked in a Brabender Plastograph under an inert atmosphere at a temperature of between 60° and 250° C. at atmospheric pressure employing an alkali metal salt or alkaline earth metal oxide, hydroxide or salt of a weak acid as cross-linking agent.

Each of the aforedescribed processes for cross-linking EVA copolymers is subject to one or more disadvantages. The processes of U.S. Pat. No. 3,491,075 and British Pat. Nos. 1,198,877 and 1,198,879 result in the by-product formation of an ester which must generally be removed from the cross-linked copolymer to provide a commercially acceptable product. The process of East German Pat. No. 94,489 appears to make mandatory the use of an inert atmosphere during the cross-linking operation. Such a requirement is undesirable from an operational standpoint. It is also known from U.S. Pat. No. 3,968,091 that mechanical working of an EVA copolymer by itself will result in a modestly reduced melt index. However, for practical reasons, it is desirable that a process be available for obtaining considerably greater reductions in melt index especially when the melt index of the starting copolymers is relatively high.

SUMMARY OF THE INVENTION

A process is provided herein for toughening rubbery EVA copolymers without producing undesirably high gel fractions. In addition, the present invention avoids the formation of any by-product ester or other residue which must be removed from the toughened copolymer. Toughening is conveniently carried out in such an oxygen-containing medium as air and initiation of the toughening reaction occurs within a relatively brief period at moderately elevated temperature.

Broadly stated, the process of this invention for toughening EVA copolymers comprises reacting a rubbery ethylenevinyl acetate copolymer with oxygen at elevated temperature in the presence of a catalytically effective amount of at least one catalyst selected from the group consisting of an alkali metal, ammonium or zinc salt of a weak aliphatic carboxylic acid, an alkali metal, ammonium or zinc salt of a weak aromatic carboxylic acid, an aliphatic tertiary amine, and an aromatic tertiary amine, for a period sufficient to provide an EVA copolymer demonstrating an appreciable increase in melt viscosity as indicated by a corresponding increase in torque measured in meter-grams or decrease in melt flow rate in grams per ten minutes compared with the values for the starting copolymer.

The toughened EVA copolymers obtained in accordance with this process are characterized by improved cold flow resistance and are especially advantageous for use in applications such as industrial coatings and in impact resistant blends with hard resins where this property is highly desired.

While it is speculated that the toughening process herein may involve a type of cross-linking, the precise mechanism whereby toughening is achieved has not yet been determined. It is understood that the invention herein is not to be limited in any way to any particular toughening mechanism including a mechanism postulating cross-linking as the underlying phenomenon.

DESCRIPTION OF THE PREFERRED EMBODIMENTS

The starting EVA copolymers employed in the practice of this invention can be prepared by any polymerization process providing resins which are thermoplastic in nature. The operable copolymers herein, namely, those containing from about 2 to about 75 weight percent of combined vinyl acetate, are advantageously prepared in accordance with any of the known and conventional high pressure bulk or solution copolymerization processes. More preferred are the EVA copolymers containing from about 10 to about 70 weight percent combined vinyl acetate. Most preferred are the rubbery EVA copolymers; i.e., those containing from about 35 to about 70 weight percent of combined vinyl acetate.

The melt index of the starting EVA copolymers herein can vary over a wide range. Typically, the copolymers will possess a melt index of from about 2 to about 40 according to ASTM D-1238 Condition E, although it will be readily appreciated by those skilled in the art that useful EVA copolymers outside this melt index range can be toughened by the process of this invention with good results.

The EVA copolymers can also contain up to about 15 weight percent of a combined third comonomer polymerizable with ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, sulfur dioxide, vinyl chloride, vinyl ethers, and the like. Acidic monomers such as acrylic acid and methacrylic acid can also be used provided the resulting terpolymer is neutralized prior to the toughening process.

The process of this invention is carried out by mixing an oxygen-containing medium, advantageously air, considered from a purely economic standpoint, into an EVA copolymer with a catalyst selected from the group consisting of alkali metal, ammonium or zinc salt of weak aliphatic or aromatic carboxylic acid and aliphatic or aromatic tertiary amine. The weak aliphatic and aromatic carboxylic acids from which the salts herein are derived preferably have a pK value in the range of from about 3 to about 10, and more preferably, from about 4 to about 6. Such salts are substantially inert to the EVA copolymer. Among the preferred salts are included the alkali metal salts of acetic, propanoic, butyric, isobutyric, benzoic, tartaric, citric, stearic, itaconoic, glycinic, adipic, and ethylbenzoic acid, and the like. Thus, for example, sodium acetate, lithium benzoate, potassium tartrate, sodium citrate, lithium stearate and similar alkali metal salts of carboxylic acids can be used with good results. It is also within the scope of this invention to add a substance such as an alkali metal oxide or alkali metal hydroxide which will react with the EVA copolymer in situ to provide the corresponding alkali metal acetate which then becomes available as catalyst for the toughening operation. However, since such in situ generation of catalyst involves some saponification, even though slight, of the EVA copolymer, it is generally preferred to incorporate preformed catalyst into the starting copolymer. Sodium acetate is particularly advantageous for use herein due to its low cost and ready availability.

The optimum amount of catalyst employed herein will vary according to the nature of the specific EVA copolymer being toughened, the amount of oxygen contacted therewith, and the temperature of the toughening operation. Generally, the quantity of catalyst will range from about 0.001 to about 5 parts per hundred by weight of EVA copolymer, and above. Preferably, from about 0.01 to 1 part per hundred of catalyst is employed herein.

In a typical procedure according to this invention, an EVA copolymer is shear-mixed in the presence of air so as to incorporate oxygen therein, the catalyst is added and the combination is mixed at a temperature at which toughening is initiated and proceeds to the desired extent, i.e., to a preselected melt viscosity value as evidenced by an increase in torque (conveniently measured in meter-grams). For most EVA copolymers, toughening is initiated at above about 140° C. The reaction of the EVA copolymer with oxygen can also be carried out at above 140° C. with due regard to the decomposition temperature of the specific resin being toughened. Accordingly, the temperature can be as high as about 225° C. but preferably, the toughening process is carried out at a temperature not exceeding about 200° C. When minimum insoluble gel is desired, mixing is stopped or an antioxidant is added at or prior to maximum melt viscosity. Otherwise, considerable gel (more than 20 percent) will be introduced even though the bulk melt viscosity may not further increase.

Reaction time may vary from about 0.001 to about one hour, but preferably is in the range of 0.01 to 0.5 hours.

Pressure is not critical, only that sufficient to maintain oxygen in intimate contact with the EVA being necessary, and may vary from about 0.01 to about 10 atmospheres.

Although low shear mixing, for example on a two roll mill, is sufficient to encourage the toughening process, in the interest of rapid reaction, high shear mixing such as in an intensive mixer or extruder is preferred in the practice of this invention.

The EVA copolymer which has thus been toughened may be stabilized to further oxidation by the addition of a suitable antioxidant, by excluding oxygen when the toughened EVA is being shear-mixed, by reducing the temperature to below the toughening initiation temperature, or by any combination of these actions. In carrying out the process of this invention, many variations are possible as will be appreciated by those skilled in the art. For example, the catalyst may be premixed with the EVA copolymer and the toughening reaction initiated by admitting air to the mixture at above about 140° C.

While, as stated above, it is preferred to carry out the toughening process herein in the presence of air as the oxygen-containing medium, it is also within the scope of this invention to utilize a composition which provides oxygen under operating conditions, e.g. a peroxide. Although residual peroxide from the polymerization stage could provide a suitable oxygen source, ordinarily an insufficient and variable level is afforded by this means, rendering subsequent addition more reliable.

In the examples which follow, melt flow rates are measured according to the specifications of ASTM D-1238. Gel contents of copolymers are portions insoluble in suitable solvent (toluene for rubbery EVA) as determined by suspending a 0.2-0.3 gram sample held within a fine wire mesh cage in the stirred solvent for 24 hours at room temperature, then drying and weighing any residues. The Brabender Plastograph torque is a measure of melt viscosity which is inversely related to melt flow rate, and is reported in meter-grams (MG). All parts are by weight unless otherwise specified. Examples 1, 4 and 5 (parts H, I, J and K) demonstrate by way of comparison the criticality of the catalyzed oxidation reaction herein.

EXAMPLE I

Forty parts of an EVA copolymer having 58 percent combined vinyl acetate content and 0.2 parts of an antioxidant mixture comprising one pair sulfur to 9 parts Ethyl-725 phenolic antioxidant (Ethyl Corporation) are mixed at 30 rpm in the roller blade equipped, open mixing chamber of a Brabender Plastograph preheated by circulating oil at 125° C. After 15-20 minutes mixing, a torque reading (melt viscosity measure) of 1,900 MG at 120° C. internal temperature is observed indicating the high melt flow character of the copolymer. The copolymer is extremely difficult to remove from the blades and mixing chamber due to its tacky nature.

EXAMPLE 2

The EVA copolymer of Example 1 (40 parts) without added antioxidant is milled in the Plastograph mixing chamber in the presence of air as in Example 1 and one part by volume of 0.5 M sodium acetate is added. Milling is continued while the temperature of the circulating oil is increased. Torque readings observed are 1,900 MG at 120° C. and 10 minutes; 1,150 MG at 136° C. and 30 minutes; 900 MG at 146° C. and 40 minutes. A rapid torque increase sets in at 40 minutes (146° C.), a reading of 7,700 MG at 65 minutes and 164° C. being observed. Similar experiments confirm that the rapid torque increase (rise in melt viscosity) sets in at 145° C. (uncorrected) melt temperature.

EXAMPLE 3

To illustrate the wise range of EVA compositions to which the process of this invention applies, and that vinyl acetate is a necessary component of the composition to be toughened, several polymer compositions are treated according to the invention. Forty parts of each polymer composition and 0.2 parts of sodium acetate trihydrate are milled in the Plastograph mixing chamber preheated to 170° C. and air is admitted to the mix. Initial and final melt flow rates are recorded together with the rates of torque (melt viscosity) increase and reported in TABLE I as follows:

TABLE I

| | Sodium Acetate-Air Toughens a Variety of EVA Copolymers | | | | | |
|---|---|---|---|---|---|---|
| Experiment Part | Resin Type | % VA | Mixing RPM | Rate Mg/Min. | MFR Orig. | (Cond. E) Final |
| A | Polyethylene | 0 | 60 | 0 | 1.3 | 1.3 |
| B | EVA | 9 | 60 | 24 | 2.6 | 1.7 |
| C | EVA | 17 | 60 | 139 | 1.3 | 0.38 |
| D | EVA | 28 | 40 | 161 | 4.7 | 0.19 |
| E | EVA | 28 | 30 | 127 | 4.7 | 0.19 |
| F | EVA | 43 | 30 | 1,600 | 11.8 | 0.003 |

TABLE I-continued

| | Sodium Acetate-Air Toughens a Variety of EVA Copolymers | | | | | |
|---|---|---|---|---|---|---|
| Experiment Part | Resin Type | % VA | Mixing RPM | Rate Mg/Min. | MFR Orig. | (Cond. E) Final |
| G | EVA | 58 | 30 | 935 | 24. | 0.07 |
| H | EVA | 70 | 30 | 70 | 26. | 3.6 |

EXAMPLE 4

To illustrate the necessity of the catalyst and of oxygen to the process of this invention, Part F of Example 3 is repeated without the sodium acetate and is again repeated with the sodium acetate but with air excluded by a nitrogen atmosphere. In both trials, no toughening occurs as is indicated by a lack of torque increase. When the second agent is then added (air or sodium acetate), a torque increase begins immediately.

EXAMPLE 5

To illustrate the variety of materials which serve as catalysts in the process of my invention, the experiment of Example 3, Part G, is repeated except that other catalysts are substituted for sodium acetate. Catalytic activity as reported in TABLE II below is apparent by comparison with that of sodium acetate (high):

TABLE II

| Various Materials Catalyze the Oxidative Toughening of EVA | | |
|---|---|---|
| Experiment Part | Material | Catalytic Activity |
| A | Ammonium acetate | Low |
| B | Potassium acetate | High |
| C | Sodium benzoate | High |
| D | Triethylene diamine | Moderate |
| E | Sodium hydroxide | High |
| F | Magnesium acetate | Low to none |
| G | Zinc acetate | Moderate |
| H | Sodium chloride | None |
| I | Sodium carbonate | None |
| J | Potassium nitrate | None |
| K | Disodium oxalate | None |

EXAMPLE 6

The experiment of Example 3, Part F, wherein an EVA of 43 percent vinyl acetate content is toughened, is repeated except that lithium stearate is substituted for the sodium acetate catalyst. Quite similar results are obtained, the rate of torque increase being 1,050 MG per minute. The torque increases to 13,000 MG at 162° C. and the product is immediately removed from the mixing chamber and blades with no difficulty. The non-tacky, tough product has the appearance of gum rubber. To prevent further oxidation, 0.2 parts of a 1:4 mixture of sulfur with 2,2-methylene bis (4-methyl-6-t-butylphenol) (commonly 2,2,4,6-) is worked into the product.

EXAMPLE 7

Example 6 is repeated except that the antioxidant mixture of sulfur and 2,2,4,6- is added when the Plastograph torque reaches 7,700 MG. The torque increase thereafter abruptly stops at 8,650 MG and the tough, non-tacky product is removed. The results are set forth in TABLE III as follows:

TABLE III

Toughened EVA has Decreased Melt Flow Rate

| Composition | Torque MG (°C.) | MFR,G/10 min. (Condition E) | Insol. Gel, % |
|---|---|---|---|
| EVA, Initial | 2,500 (150) | 11.8 | 0 |
| Product, Ex. 7 | 8,650 (160) | 0.05 | 0 |
| Product, Ex. 6 | 13,000 (162) | 0.002 | 19.4 |

EXAMPLE 8

An antioxidant mixture of 1:9 sulfur plus Ethyl-725, 0.5 part, is added just as the maximum torque is reached in the experiment of Example 3, Part F. Despite continued milling for an additional 17 minutes (total 30 minutes), the product retains MFR (Condition E) 0.01 G/10 min. and has only 10.3 percent gel.

EXAMPLE 9

To 40 parts of a terpolymer of ethylene, vinyl acetate and sulfur dioxide (45.7:39.3:15.0 by weight) milled in the Plastograph at 60 rpm and 165° C. is added 0.2 parts of sodium acetate trihydrate. An MFR (Condition E) decrease from 8.2 to 3.9 G/10 min. occurs over a 12-minute period.

EXAMPLE 10

To 100 parts of EVA having 43 percent vinyl acetate content milled on a small 2 roll mill at roll temperature 150° C. is added 0.2 part of sodium acetate as a 0.5 molar solution in water. Milling is continued for 30 minutes with a good nip and some cutting to increase mixing. After 30 minutes there are added 0.5 parts of stearic acid and 0.5 parts of a 1:9 mixture of sulfur and Ethyl-725 phenolic antioxidant. An MFR (Condition E) decreasing from 11.8 to 3.6 G./10 min. occurs by milling with sodium acetate in air.

EXAMPLE 11

The product of Example 3, Part G, stabilized with 0.25 parts of added antioxidant comprising 1:4 sulfur powder plus 2,2,4,6-, is compared with the starting EVA copolymer, stabilized in the same way, in a creep test. Strips of each, 5 in. by 1 in. by 50 mils, cut from compression molded sheets, are suspended with 8.1 g. weights attached at the lower ends. In 54 minutes the starting EVA copolymer stretches to five times its original length. The product toughened by the process herein does not stretch measurably over the measurement period of 17 hours at the same temperature (25° C.), thus showing remarkable loss of cold flow.

EXAMPLE 12

Forty parts of the EVA copolymer of Example 3, Part F, are milled in the Plastograph at 40 rpm and heated under nitrogen. At 155° C. internal temperature, air is admitted. A slow torque decrease takes place while 0.5 M sodium acetate solution is added drop-wise. When the fourth drop is added ten minutes after air admission, a sudden increase in torque begins. The minimum catalyst amount for the particular EVA copolymer used is, therefore, four times 0.005 or about 0.02 PHR (assuming one drop to be approximately 1/20 ml) to overcome any contaminating acidity and to initiate the toughening reaction.

What is claimed is:

1. A process for toughening ethylene-vinyl acetate copolymers which comprises reacting a rubbery ethylene-vinyl acetate copolymer containing from about 2 to about 75 weight percent combined vinyl acetate, having a melt index of from 2 to about 40 and being derived from the copolymerization of ethylene and vinyl acetate with or without a third comonomer polymerizable with ethylene and vinyl acetate, it being provide that if such third comonomer is acidic, the resulting terpolymer is neutralized prior to the toughening process, with oxygen at elevated temperature in the presence of a catalytically effective amount of at least one catalyst selected from the group consisting of an alkali metal, ammonium or zinc salt of an aliphatic carboxylic acid having a pH value in the range of from about 3 to about 10, an alkali metal, ammonium or zinc salt of an aromatic carboxylic salt having a pK value in the range of from about 3 to about 10, an aliphatic tertiary amine, and an aromatic tertiary amine, for a period sufficient to provide an ethylene-vinyl acetate copolymer demonstrating an appreciable decrease in melt flow rate compared with the melt flow rate of the starting copolymer.

2. The process of claim 1 wherein the starting ethylene-vinyl acetate copolymer contains from about 35 to about 70 weight percent combined vinyl acetate.

3. The process of claim 1 wherein the oxygen is supplied as air.

4. The process of claim 1 wherein the catalyst is the salt of an aliphatic or aromatic carboxylic acid having a pK value in the range of from about 2 to about 6.

5. The process of claim 1 wherein the catalyst is sodium acetate.

6. The process of claim 1 wherein from about 0.001 to about 5 parts by weight of catalyst per hundred parts by weight of ethylene-vinyl acetate copolymer is employed.

7. The process of claim 1 wherein from about 0.01 to about 1 part by weight of catalyst per hundred parts by weight of ethylene-vinyl acetate copolymer is employed.

8. The process of claim 1 wherein the reaction temperature is in the range of from about 140° C. to about 225° C.

9. The process of claim 8 wherein the reaction time is from about 0.001 to about 1 hour.

10. The process of claim 9 wherein the reaction time is from about 0.01 to about 0.5 hours.

11. The process of claim 1 wherein the reaction is carried out at from about 0.01 to about 10 atmospheres.

12. A process for toughening ethylene-vinyl acetate copolymers which comprises reacting a rubbery ethylene-vinyl acetate copolymer containing from about 2 to about 75 weight percent combined vinyl acetate having a melt index of from 2 to about 40 and being derived from the copolymerization of ethylene and vinyl acetate with or without a third comonomer polymerizable with ethylene and vinyl acetate, it being provided that if such third comonomer is acidic, the resulting terpolymer is neutralized prior to the toughening process, with oxygen supplied as air at a temperature of from about 140° C., to about 225° C. at a pressure of from about 0.01 to about 10 atmospheres in the presence of from about 0.001 to about 5 parts by weight of an alkali metal, ammonium or zinc salt of a weak aliphatic carboxylic acid or aromatic carboxylic salt having a pK value in the range of from about 2 to about 6 as catalyst for from about 0.01 to about 0.5 hours to provide an ethylene-vinyl acetate copolymer demonstrating an appreciable increase in melt viscosity compared with the melt flow rate of the starting copolymer.

13. The process of claim 12 in which the catalyst is sodium acetate.

14. A process for toughening ethylene-vinyl acetate copolymers which comprises reacting a rubbery ethylene-vinyl acetate copolymer containing from about 2 to about 75 weight percent combined vinyl acetate having a melt index of from about 2 to about 40 and being derived from the copolymerization of ethylene and vinyl acetate with or without a third comonomer polymerizable with ethylene and vinyl acetate, it being provided that if such third comonomer is acidic, the resulting terpolymer is neutralized prior to the toughening process, with oxygen at elevated temperature in the presence of a catalytically effective amount of an alkali metal salt of an aliphatic carboxylic acid having a pK value in the range of from about 3 to about 10 for a period sufficient to provide an ethylene-vinyl acetate copolymer demonstrating an appreciable decrease in melt flow rate compared with the melt flow rate of the starting copolymer.

15. A process for toughening ethylene-vinyl acetate copolymers which comprises reacting a rubbery acetate copolymer containing from about 2 to about 75 weight percent combined vinyl acetate having a melt index of from 2 to about 40 and being derived from the copolymerization of ethylene and vinyl acetate with or without a third comonomer polymerizable with ethylene and vinyl acetate, it being provided that if such third comonomer is acidic, the resulting terpolymer is neutralized prior to the toughening process, with oxygen supplied as air at a temperature of from about 140° C. to about 225° C. at a pressure of from about 0.01 to about 10 atmospheres in the presence of from about 0.001 to about 5 parts by weight of an alkali metal salt of an aliphatic carboxylic acid or aromatic carboxylic salt having a pK value in the range of from about 2 to about 6 as catalyst for from about 0.01 to about 0.5 hours to provide an ethylene-vinyl acetate copolymer demonstrating an appreciable decrease in melt flow rate compared with the melt flow rate of the starting copolymers.

* * * * *